United States Patent
Vassort

(10) Patent No.: US 9,852,767 B2
(45) Date of Patent: Dec. 26, 2017

(54) METHOD FOR GENERATING A CYCLIC VIDEO SEQUENCE

(71) Applicant: Thomas Niel Vassort, Paris (FR)

(72) Inventor: Thomas Niel Vassort, Paris (FR)

( * ) Notice: Subject to any disclaimer, the term of this patent is extended or adjusted under 35 U.S.C. 154(b) by 0 days.

(21) Appl. No.: 15/074,645

(22) Filed: Mar. 18, 2016

(65) Prior Publication Data

US 2016/0275990 A1 Sep. 22, 2016

(30) Foreign Application Priority Data

Mar. 20, 2015 (FR) ...................................... 15 52350

(51) Int. Cl.
| | | |
|---|---|---|
| *H04N 5/93* | (2006.01) | |
| *G11B 27/034* | (2006.01) | |
| *G06T 13/80* | (2011.01) | |
| *G11B 27/038* | (2006.01) | |
| *G11B 27/06* | (2006.01) | |
| *G11B 27/34* | (2006.01) | |

(52) U.S. Cl.
CPC ............ *G11B 27/034* (2013.01); *G06T 13/80* (2013.01); *G11B 27/038* (2013.01); *G11B 27/06* (2013.01); *G11B 27/34* (2013.01); *G06T 2210/44* (2013.01)

(58) Field of Classification Search
CPC ............................... G06T 13/80; G11B 27/038
USPC ........................................ 386/262, 266, 282
See application file for complete search history.

(56) References Cited

U.S. PATENT DOCUMENTS

| | | | | |
|---|---|---|---|---|
| 6,289,165 B1 * | 9/2001 | Abecassis | .............. | G11B 19/02 |
| | | | | 348/E5.105 |
| 6,504,990 B1 * | 1/2003 | Abecassis | .............. | G11B 19/02 |
| | | | | 348/E5.105 |
| 6,611,268 B1 * | 8/2003 | Szeliski | .................. | G06T 13/80 |
| | | | | 345/420 |
| 6,636,220 B1 * | 10/2003 | Szeliski | ................. | G06T 13/80 |
| | | | | 345/475 |

(Continued)

FOREIGN PATENT DOCUMENTS

EP 2557773 2/2013

OTHER PUBLICATIONS

French Search Report dated Jan. 21, 2016, French Application No. FR1552350.

(Continued)

*Primary Examiner* — Helen Shibru
(74) *Attorney, Agent, or Firm* — Blakely Sokoloff Taylor & Zafman LLP

(57) ABSTRACT

A method for generating a cyclic video sequence (SC), implemented by a data-processor (11). The method includes receiving a video sequence (S); determining a first singular point (P1) of the video sequence (S) in a first interval (I1) of the sequence (S) and a second singular point (P2) of the video sequence (S) in a second interval (I2) of the sequence (S). The first and second singular points (P1, P2) have a maximum similarity according to a given similarity criterion; then generating a connecting sequence (SR) between the image of the video sequence (S) corresponding to the second singular point (P2) and the image of the video sequence (S) corresponding to the first singular point (P1) by morphing then constructing the cyclic video sequence (SC) by concatenation of a fragment (S') of the video sequence (S) extending from the first singular point (P1) to the second singular point (P2), and of the connecting sequence (SR).

14 Claims, 2 Drawing Sheets

(56) References Cited

U.S. PATENT DOCUMENTS

| | | | |
|---|---|---|---|
| 2005/0022252 A1* | 1/2005 | Shen | G06F 17/30017 725/135 |
| 2006/0129933 A1* | 6/2006 | Land | G11B 27/034 715/723 |
| 2012/0276509 A1* | 11/2012 | Iannotti | G09B 23/30 434/267 |
| 2013/0229581 A1* | 9/2013 | Joshi | G11B 27/031 348/584 |
| 2014/0095996 A1* | 4/2014 | Hogben | G06F 17/30017 715/716 |
| 2016/0104311 A1* | 4/2016 | Allyn | G06F 17/3012 345/473 |

OTHER PUBLICATIONS

Joshi, Neel, et al., "Cliplets: Juxtaposing Still and Dynamic Imagery", Proceedings of the 25th Annual ACM Symposium on User Interface Software and Technology, UIST '12, Oct. 7, 2012, 251-260.

Schödl, Arno, et al., "Video Textures", Computer Graphics Proceedings, SigGraph 2000 Conference Proceedings, New Orleans, LA, Jul. 23, 2000, 489-498.

Tompkin, James, et al., "Towards Moment Imagery: Automatic Cinemagraphs", Visual Media Production (CVMP), 2011 Conference for IEEE, Nov. 16, 2011, 87-93.

* cited by examiner

METHOD FOR GENERATING A CYCLIC VIDEO SEQUENCE

GENERAL TECHNICAL FIELD

The present invention relates to the field of video animation.

More precisely, it relates to a method for generating a cyclic video sequence.

PRIOR ART

It is common today to hear "cyclic" sound sequences, that is, played in a loop: the sequence is designed to present an identical start and a finish such that it is possible to repeat in a loop many times, with a listener getting the impression that this is a continuous sequence.

Making a "cyclic" video sequence is much more complex to the extent where a set of actors is controlled much less well than a sound, and it is impossible to create an exactly identical start and finish. Such a sequence played as a loop cannot delude the human eye which instantaneously sees the "connection", that is, the moment when playing is restarted.

So, sequences played for example on wall advertising are generally clips separated by black backgrounds.

If the aim all the same is to give the illusion of a loop, animated GIFs are known which comprise a succession of images, but not a real video sequence. Insofar as the frame rate is far fewer than 24 images per second, there is often a consequent gap between two successive images and the human eye is much more "tolerant" to the connection. The animated GIF is often used for what is called "cinemagraphs", that is, animated photographs of a slight repetitive movement (generally over a small portion on the first plane of the image, the background remaining fixed). The possibilities offered by the animated GIF remain very limited, and in all cases allow poor quality only, far from the video sequences of "movie" quality.

It would consequently be preferable to have a solution letting a user create video sequences in a loop of cinema quality, with a rendition such that the human eye has the impression of a continuous sequence.

PRESENTATION OF THE INVENTION

According to a first aspect the present invention relates to a method for generating a cyclic video sequence, characterized in that it comprises implementing equipment by data-processing means by steps of:
 (a) Reception from video-acquisition means of a video sequence;
 (b) Determination of a first singular point of the video sequence in a first interval of said sequence and a second singular point of the video sequence in a second interval of said sequence, said first and second singular points having a maximum similarity according to a given similarity criterion;
 (c) Generation of a connecting sequence between the image of the video sequence corresponding to the second singular point and the image of the video sequence corresponding to the first singular point by morphing;
 (d) Construction of said cyclic video sequence by concatenation of a fragment of said video sequence extending from the first singular point to the second singular point, and of said connecting sequence.

From a standard filmed video sequence, the present invention combines the determination of a couple of optimal singular points to define a body of quasi-cyclic sequence extending from the first to the second singular point, and the generation (by morphing) of a connecting sequence to return to the first singular point from the second singular point.

Therefore the final resulting sequence is completely cyclic and can be diffused in a loop with a perfect rendition since its start and finish coincide exactly.

According to other advantageous and non-limiting characteristics:
 said video sequence comprises a substantially periodic pattern of a given duration which is shorter than the duration of the video sequence, the second interval corresponding to the first interval offset by a duration approximately equal to a multiple of said duration of the pattern;
 said video sequence comprises several substantially periodic patterns, the method comprising performing steps (b) to (d) for each of the patterns so as to generate a plurality of cyclic sequences;
 the method comprises a construction step (e) of at least one transition sequence between two of the generated cyclic sequences, said transition sequence being a fragment of said video sequence extending from the first singular point of one of said two cyclic sequences to the first singular point of the other of said two cyclic sequences;
 said first interval defines a sub-sequence of said video sequence having a character more dynamic than the rest of the video sequence;
 evaluation of the dynamic character of a point of the sequence also comprises the comparison of the image of the sequence corresponding to the point with the preceding image and/or the following image of the sequence;
 said dynamic character relates to at least one attention area of the image;
 step (b) comprises for each couple of a point of the first interval and a point of the second interval the evaluation of the similarity between the two points, the first and second singular points being selected as the couple of points having the greatest similarity;
 said similarity criterion between two points of the video sequence comprises a static component and a dynamic component;
 evaluation of the static component of the similarity criterion between two points of the sequence comprises comparison of the two images of the sequence corresponding to each of the two points;
 evaluation of the dynamic component of the similarity criterion between two points of the sequence comprises comparison of the two images preceding and/or of two images following the two images of the sequence corresponding to each of the two points;
 evaluation of the dynamic component of the similarity criterion between two points of the sequence also comprises the respective comparison of each of the two images of the sequence corresponding to the two points with the preceding image and/or the following image of the sequence.

According to a second aspect, the invention relates to a system for generating a cyclic video sequence, comprising video-acquisition means of a video sequence and equipment comprising data-processing means configured to implement:
 A reception module of said video sequence;

A module for determination of a first singular point of the video sequence in a first interval of said sequence and a second singular point of the video sequence in a second interval of said sequence, said first and second singular points having a maximum similarity according to a given similarity criterion;

A morphing module for generating a connecting sequence between the image of the video sequence corresponding to the second singular point and the image of the video sequence corresponding to the first singular point;

A construction module of said cyclic video sequence by concatenation of a fragment of said video sequence extending from the first singular point to the second singular point, and of said connecting sequence.

According to a third and a fourth aspect, the invention respectively relates to a computer program product comprising code instructions for execution, when this program product is executed by data-processing means, of a method according to the first aspect of the invention for generating a cyclic video sequence; and storage means readable by computer hardware on which a computer program product comprises code instructions for execution of a method according to the first aspect of the invention for generating a cyclic video sequence.

PRESENTATION OF FIGURES

Other characteristics and advantages of the present invention will emerge from the following description of a preferred embodiment. This description will be given in reference to the appended drawings, in which.

DETAILED DESCRIPTION

Architecture

Figure 1:
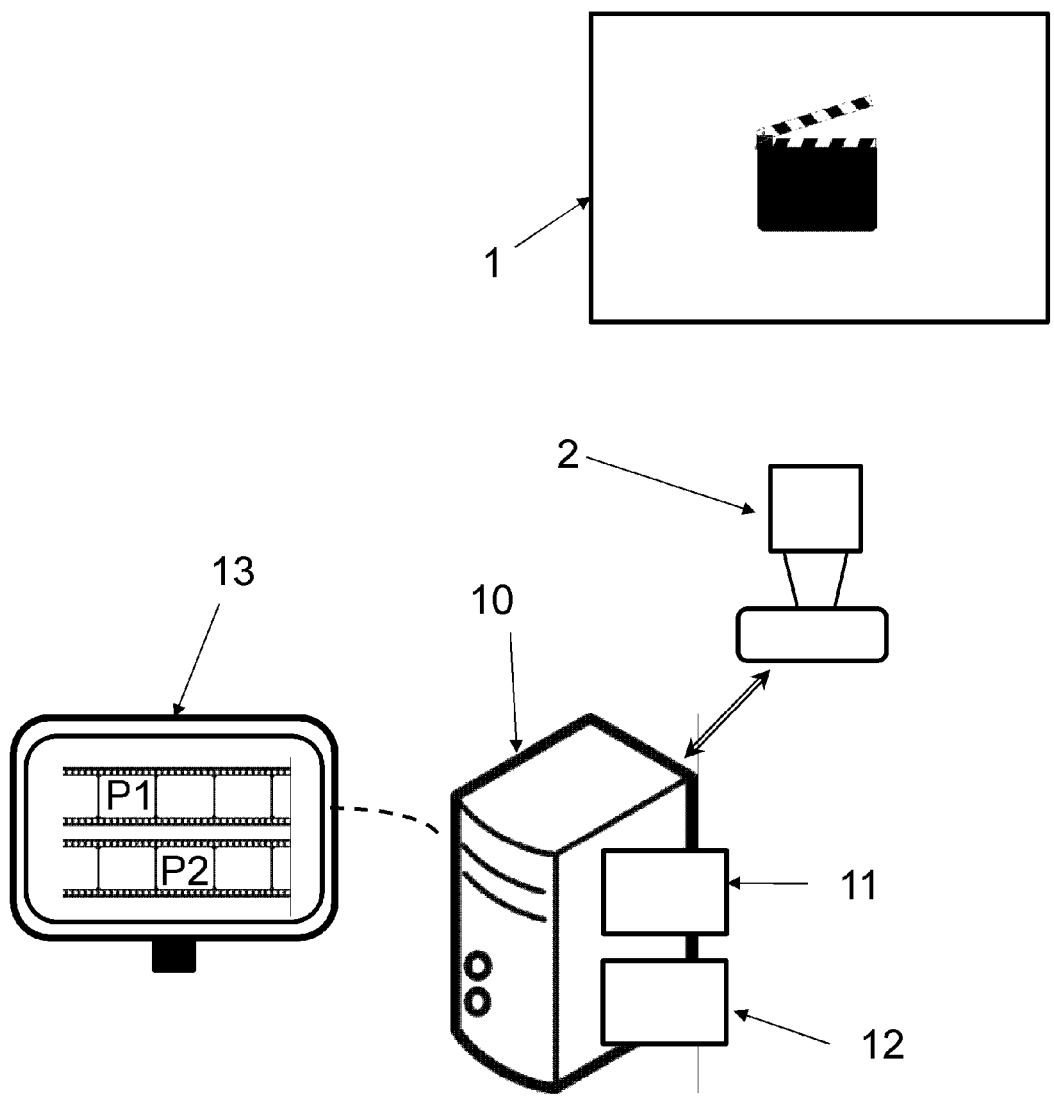
FIG. 1 illustrates an embodiment of a system for executing a method according to the invention.

In reference to FIG. 1, the present method for generating a cyclic video sequence is executed at the level of equipment 10 comprising data-processing means 11 (in particular a processor) and data-storage means 12 (memory, for example a hard drive). The equipment 10 is typically a workstation, equipped with a user interface 13 (a keyboard, mouse, monitor, etc.).

The equipment 10 is directly or indirectly connected to video-acquisition means 2, consisting typically of one or more conventional cameras, capable of acquiring a video sequence S representing a scene 1. "Directly or indirectly" means:

in the first case, that the means 2 and the equipment 10 are connected during acquisition of a datum via a cable or a network, the video file produced during acquisition being able to be loaded in real time on the equipment 10;

in the second case, that the means 2 comprise their own memory which is connected in turn to the equipment 10 for loading of the video sequence onto the data-storage means 12 for processing.

In all cases it is understood that the present method is not at all limited to any one operating mode of acquisition means 2, and it suffices only that they are capable of generating a digital file representative of a video sequence S, so that the data-processing means 11 of the equipment 10 can receive them in a step (a). In most cases the video sequence S will be stored on the storage means 12 to be processed.

It is noted that in most cases the acquisition means 2 will be fixed in front of a scene 1 having a few moving elements, and this will make carrying out the method easier and will improve its rendition.

Cyclic Sequence

The present method aims to generate a cyclic sequence SC from an initial video sequence S.

It is noted that this is the case of a "real" video sequence S, that is, a scene 1 of the reality which can be filmed by a video camera, and not computer-generated images for example.

The cyclic sequence SC is a sequence capable of being played in a loop (as opposed to the sequence S), that is, it has a sufficiently close start and finish so that it is possible to repeat it without the human eye being capable (or with difficulty) of noticing restarting.

The initial sequence S can be any sequence, even though it is naturally preferred (for reasons of quality of the final result) for it to contain a substantially periodic pattern, and for it to be overall fixed, for example filmed on a green background, to improve <<the homogeneity>> of the sequence.

Returning to the periodic aspect, it is preferable for example for this sequence S to represent an actor repeating the same movement continuously several times. In other words, the actor returns one or more times substantially to his point of departure during movement. At this level it is not necessary (and even impossible) for the actor to perform exactly the same movement several times (if it was possible there would not even be any need to carry out the present method).

This is why it is said that the sequence is "substantially" periodic: there are several occurrences of the same movement without these occurrences being exactly identical, and in the case of the play of an actor it really is enough for the latter to move through sufficiently close intermediary positions so that "singular points" can be identified. Substantially periodic pattern means that the sequence S tries to simulate a loop by comprising an element approximately reproduced one or more times.

Singular Points

Figure 2:
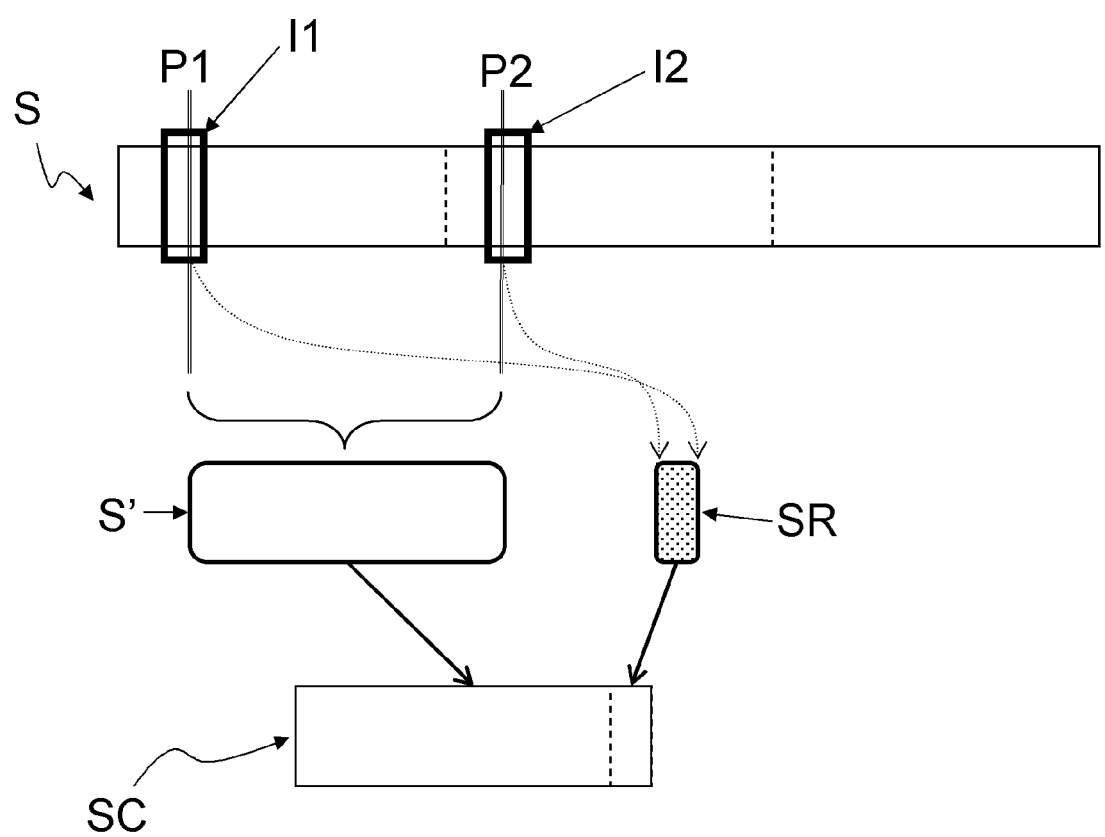
FIG. 2 illustrates the generation of a cyclic sequence due to an embodiment of the method according to the invention.

In reference to FIG. 2, the method comprises in a step (b) determination of a first singular point P1 of the video sequence S in a first interval I1 of said sequence S and of a second singular point P2 of the video sequence S in a second interval I2 of said sequence S, said first and second singular points P1, P2 having a maximum similarity according to a given similarity criterion.

The idea is to identify the two points of the sequence S which are the most "similar", that is, the most capable of acting as loop point (that is, start/finish of the loop).

These singular points are each searched for at a probable interval, that is, the first and second intervals I1, I2 correspond to fragments of the sequence S likelier than other to comprise singular points. It is noted that one and/or the other of the first and second intervals I1, I2 can be the entire sequence S, but this markedly slows execution of the method. Preferably, the two intervals I1, I2 are disjointed, and more particularly the second interval I2 is defined as a function of the first interval I1. Indeed, logically the two most similar points of any video sequence are two immediately neighboring points (separated by an image), of no significance in generating the cyclic sequence SC. It is preferable for the latter to have a minimum length, hence the significance of defining intervals. As is preferred, if there is an estimation of the duration of a pattern, the second interval corresponds to the first interval offset by the same duration (or by a multiple of the same duration): the two intervals I1, I2 correspond to very similar fragments of the sequence S, which are likely to contain resembling points. It is also clear that the intervals do not have to be continuous. In particular, if a pattern is repeated more than once, the second interval I2 can be defined as the union of the offsets of the first interval I1 of at least one time the duration of the pattern.

The first interval I1 does not have to be selected at the start of a pattern: it can be in the middle, the second interval I2 then being at the same level in the following iteration of the pattern, or in an even later iteration (i.e. offset by a multiple of the approximate duration of the pattern, "multiple" including one time). As is preferred, the first interval I1 is selected as corresponding to a moment of the pattern having a "dynamic" character, that is, locally have strong movement, by contrast with more of a static moment. Preferably, the dynamism relates to areas so-called "attention" areas of the image. These are points traditionally drawn by the human eye, such as a face, a hand, etc. These so-called attention areas will preferably be selected as parts of animated beings (humans, animals) visible in the sequence S.

These attention areas are actually those at which:
    first, disparities are the likeliest to exist, since by definition these are the "living" movements impossible to reproduce exactly identically, as opposed to those inanimate objects; and
    second, a human could most easily spot a bad connection.

The more they are in movement, the more the loop will pass unnoticed. The attention areas can be identified by recognition of image or designated by a user. Examples of ways of quantifying the dynamic character of a point of the sequence will be defined hereinbelow in the present description.

The length of the intervals I1, I2 is selected as a function of the length of the sequence S, its dynamism, the power of the data-processing means 11, etc. A few seconds seem to be enough. It is noted that the intervals can be defined by an operator on the interface 13.

The example of FIG. 2 represents an example of sequence S comprising three patterns. In other words, the filmed object passes four times (each time approximately) by its starting point. The moment of greatest dynamism is around a third of the pattern, and defines the first interval at this level. The second interval I2 is defined as the translation of the first interval I1 of one and/or two patterns. In the example shown, only the one offset once is chosen.

Similarity

"Similarity" means the level of resemblance for the human eye. The greater the similarity between two images, the more a human can believe that it is the same image, and not see any difference between these images.

As explained, the two points having the maximum similarity in each interval I1, I2 are identified. This can be a rough iterative test comprising for each couple of a point of the first interval I1 and a point of the second interval I2 evaluation of similarity between the two points, the first and second singular points being selected as the couple of points having the greatest similarity. Alternatively, it suffices to find two points having a similarity beyond an acceptable threshold. It is to be noted that this step can be performed purely by the data-processing means 11, or comprise verification by a user who will compare couples of candidate points and designate the best in terms of the human eye. FIG. 1 for example shows on the interface means 13 selected images of each of the intervals I1, I2, and the operator makes the final choice.

The evaluation of similarity between two points of the sequence S preferably comprises calculation of two components:
    a "static" component, i.e. a comparison, in particular pixel by pixel, of the two target images. A score can for example represent the number of different pixels, or the average spread in RGB of pixels two by two, etc. It is clear that the importance of the so-called attention points mentioned above can be considered by attributing them with a very high weighting coefficient;
    a "dynamic" component. In fact, it is not impossible for a sequence to include two exactly identical images, but which cannot be connected. For example, if a pendulum swinging from left to right is filmed, on one pattern it will pass exactly through the centre twice (once from the left and once from the right). These two images may well be perfectly identical, but they are not similar as the movement is not the same (the pendulum comes from the left once and the other time from the right), and a human eye will suddenly see a problem if the images were presented chained. For this reason, the dynamic component is evaluated for example by looking at the images before and/or after the target image. It is preferable:
        That the images immediately before (respectively immediately after) each of the target images are most identical to each other "statically" (the criteria defined hereinabove could be used), which shows that the movement is similar. In fact, if the two target images are identical but not the two images above, they are each registered in a different movement and they are not acceptable for a connection;
        That the image immediately before (respectively after) each of the target images and the target image itself are the most different, i.e. the least identical (the comparison mechanisms just mentioned can be used). In fact, the more different the two successive images, the more pronounced the dynamic character of the instant, and the more imperceptible a connection is at this time. Comparison of two successive images is thus a way for evaluating at the same time the dynamic character of a point of the sequence (see above). Higher weighting coefficients can be applied to the attention areas The similarity can be calculated for example as a linear combination of its static and dynamic scores. In general, it is understood that the singular points P1 and P2 correspond most often to close target images, preceded or followed by images close together, but different enough from the target images themselves.

It is understood that the present invention is not limited to any particular way of evaluating the similarity of points of the sequence S, and the skilled person can transpose many known image analysis techniques.

Morphing

On completion of step (b), there are the first and second singular points P1, P2 of the sequence, which are two of those most closely comparable points of the sequence. The fragment S' of said video sequence S extending from the first singular point P1 to the second singular point P2 (see FIG. 2) could almost be looped.

Despite all this, these points P1, P2 are never similar to 100%, and looping between P2 and P1 would be visible by the human eye which would see the transition.

In a step (c) the present method comprises generation of a connecting sequence SR between the image of the video sequence S corresponding to the second singular point P2 and the image of the video sequence (S) corresponding to the first singular point P1. This connecting sequence SR is formed by morphing (or "morphosis"), a well-known technique. To the extent where the points P2 and P1 are very similar, morphing is slight and passes unnoticed to the eyes of spectators. The duration of the connecting sequence is advantageously very short, typically under a second. It is evident that the length of the connecting sequence SR can be a function of the dynamic character of the sequence S at the level of points P1 and P2: the more dynamic the movement, the shorter the connecting sequence SR must be so as not to interrupt the movement.

The skilled person could use any existing algorithm to conduct this morphing step.

Construction of the Cyclic Sequence

In a final step (d), the data-processing means 11 construct the cyclic video sequence SC by concatenation of the fragment S' of said video sequence S extending from the first singular point P1 to the second singular point P2, and of said connecting sequence SR.

So, during sequence S', movement is from P1 to P2, and during connecting sequence back again from P2 to P1, which closes the loop.

The start and finish of the resulting cyclic sequence SC are exactly identical, and the sequence SC can be diffused into a perfectly fluid loop and looped on display means (as wall advertising), and the observer will not see the transition.

Multiple or Dynamic Loops

According to a particular embodiment (and if the sequence S allows), it is possible to generate multiple cyclic sequences SC. The idea is to identify several patterns within the initial sequence S and define a loop for each. For example, the actor can continuously perform a movement A (first pattern) three times, then perform a movement B (second pattern) twice. Steps (b) to (d) can be conducted for each of the patterns so as to generate several cyclic sequences SC which could each be diffused in a loop, enabling transitions from one cyclic sequence to another cyclic sequence. At least one of these transitions can be constructed in a step (e) by extracting the fragment of S binding a singular point of a cyclic sequence SC to a singular point of another.

For example, if a first cyclic sequence SCa is defined by a fragment [P1-P2] of S (between the singular points P1 and P2) and a second cyclic sequence SCb is defined by a fragment [P3-P4] of S between the singular points P3 and P4, with the points P1, P3, P2 and P4 being arranged in this order within the sequence S, the fragment [P1-P3] defines a transition from SCa to SCb, and the fragment [P3-P2]+ SRa (the connecting sequence associated with the first cyclic sequence SCa, corresponding to the morphing from P2 to P1) defines a transition from SCb to SCa.

On the condition of arranging a very long sequence S comprising many patterns (or even several sequences S in which the actor describes the same movements), it is possible to generate a family of cyclic sequences SC, the user being able for example to trigger transitions from one to another as a function of various interactions when it is diffused (for example touching an area of the display, triggering a motion detector by passing in front of the display, etc.).

According to another particular embodiment, the loop can be dynamic, and change from one iteration to the other (or at the end of a certain number of iterations), either by computer processing the cyclic sequence SC to obtain modified cyclic sequences SC', SC", etc., or by using the technique of multiple loops as above. For example, a loop whereof the duration follows a dynamic element, for example the seasons, can be envisaged. The length of the loop will change from day to day with the length of the day, and will change completely at each season (a winter loop, an autumn loop, a summer loop, and a spring loop).

System and Computer Program Product

According to a second aspect, the invention relates to a system for generating a cyclic video sequence SC for executing the method according to the first aspect.

The system comprises as explained video-acquisition means 2 of a video sequence S and equipment 10 comprising data-processing means 11 (and typically data storage means 12 and an interface 13).

The data-processing means 11 are configured to implement:
  A reception module of said video sequence S;
  A module for determination of a first singular point P1 of the video sequence S in a first interval I1 of said sequence S and a second singular point P2 of the video sequence S in a second interval I2 of said sequence S, said first and second singular points P1, P2 having a maximum similarity according to a given similarity criterion;
  A morphing module for generating a connecting sequence SR between the image of the video sequence S corresponding to the second singular point P2 and the image of the video sequence S corresponding to the first singular point P1;
  A construction module of said cyclic video sequence SC by concatenation of a fragment S' of said video sequence S extending from the first singular point P1 to the second singular point P2, and of said connecting sequence SR.

According to a third and a fourth aspects, the invention relates to a computer program product comprising code instructions for execution, when this program product is executed by data-processing means 11 (typically those of the equipment 10), of a method according to the first aspect of the invention for generating a cyclic video sequence, as well as storage means readable by computer hardware (typically the data storage means 12 of the equipment 10) on which a computer program product containing these code instructions.

The invention claimed is:

1. A method for generating a cyclic video sequence, implemented by a data processor, comprising:
   (a) receiving a video sequence acquired by a video camera, said video sequence comprising a substantially periodic pattern of a given duration which is shorter than the duration of the video sequence;
   (b) determining a first singular point of the video sequence in a first interval of said sequence and a second singular point of the video sequence in a second interval of said sequence, the second interval corresponding to the first interval offset by a duration approximately equal to a multiple of said duration of said pattern of the video sequence, and said first and second singular points having a maximum similarity according to a given similarity criterion;
   (c) generating a connecting sequence between the image of the video sequence corresponding to the second singular point and the image of the video sequence corresponding to the first singular point by morphing;
   (d) constructing said cyclic video sequence by concatenating a fragment of said video sequence extending from the first singular point to the second singular point, and said connecting sequence.

2. The method according to claim 1, wherein said video sequence comprises several substantially periodic patterns, the method comprising performing said steps (b) to (d) for each of the patterns so as to generate a plurality of cyclic sequences.

3. The method according to claim 2, comprising a constructing step (e) of at least one transition sequence between two of the generated cyclic sequences, said transition sequence being a fragment of said video sequence extending from the first singular point of one of said two cyclic sequences to the first singular point of the other of said two cyclic sequences.

4. The method according to claim 1, wherein said first interval defines a sub-sequence of said video sequence having a character more dynamic than the rest of the video sequence (S).

5. The method according to claim 4, wherein evaluation of the dynamic character of a point of the sequence also comprises comparison of the image of the sequence corresponding to the point with the preceding image and/or the following image of the sequence.

6. The method according to claim 4 or claim 5, wherein said dynamic character relates to at least one attention area of the image.

7. The method according to claim 1, wherein said step (b) comprises for each couple of a point of the first interval and a point of the second interval the evaluation of the similarity between the two points, the first and second singular points being selected as the couple of points having the greatest similarity.

8. The method according to claim 1, wherein said similarity criterion between two points of the video sequence comprises a static component and a dynamic component.

9. The method according to claim 8, wherein the evaluation of the static component of the similarity criterion between two points of the sequence comprises the comparison of the two images of the sequence corresponding to each of the two points.

10. The method according to claim 8 or claim 9, wherein the evaluation of the dynamic component of the similarity criterion between two points of the sequence comprises comparison of the two preceding images and/or of the two images following the two images of the sequence corresponding to each of the two points.

11. The method according to claim 10, wherein the evaluation of the dynamic component of the similarity criterion between two points of the sequence also comprises the respective comparison of each of the two images of the sequence corresponding to the two points with the preceding image and/or the following image of the sequence.

12. A non-transitory computer program product comprising instructions for execution, a data processor of a method according to claim 1 for generating a cyclic video sequence.

13. A non-transitory storage readable by computer hardware on which a computer program product comprises code instructions for execution of a method according to claim 1 for generating a cyclic video sequence.

14. A system for generating a cyclic video sequence, comprising a video camera for acquiring a video sequence comprising a substantially periodic pattern of a given duration which is shorter than the duration of the video sequence, and equipment comprising a data-processor configured to implement:

A reception module of said video sequence;

A module for determination of a first singular point of the video sequence in a first interval of said sequence and a second singular point of the video sequence in a second interval of said sequence, the second interval corresponding to the first interval offset by a duration approximately equal to a multiple of said duration of said pattern of the video sequence, and said first and second singular points having a maximum similarity according to a given similarity criterion;

A morphing module for generating a connecting sequence between the image of the video sequence corresponding to the second singular point and the image of the video sequence corresponding to the first singular point;

A construction module of said cyclic video sequence by concatenation of a fragment of said video sequence extending from the first singular point to the second singular point, and of said connecting sequence.

* * * * *